United States Patent [19]

Shimizu et al.

[11] Patent Number: 4,535,069

[45] Date of Patent: Aug. 13, 1985

[54] CATALYST COMPONENT FOR α-OLEFIN POLYMERIZATION

[75] Inventors: Hiroshi Shimizu; Masaki Abe; Akihiro Sato, all of Chibaken, Japan

[73] Assignee: Chisso Corporation, Osaka, Japan

[21] Appl. No.: 466,971

[22] Filed: Feb. 16, 1983

[30] Foreign Application Priority Data

Apr. 30, 1982 [JP] Japan ................................ 57-72994

[51] Int. Cl.$^3$ .............................................. C08F 4/64
[52] U.S. Cl. ..................................... 502/115; 502/119; 502/127; 502/108; 526/127; 526/142
[58] Field of Search .................... 502/127, 119, 115

[56] References Cited

U.S. PATENT DOCUMENTS

| | | | |
|---|---|---|---|
| 4,250,285 | 2/1981 | Minami et al. | 502/127 X |
| 4,252,670 | 2/1981 | Caunt et al. | 502/111 X |
| 4,295,991 | 10/1981 | Wristers | 502/127 X |
| 4,301,029 | 11/1981 | Caunt et al. | 502/119 X |
| 4,309,521 | 1/1982 | Sato et al. | 502/127 X |
| 4,330,651 | 5/1982 | Sakurai et al. | 502/127 X |

FOREIGN PATENT DOCUMENTS 56-115301 9/1981 Japan.

*Primary Examiner*—Patrick Garvin
*Attorney, Agent, or Firm*—Fred Philpitt

[57] ABSTRACT

A supported type catalyst component for α-olefin polymerization, having a higher activity and capable of affording a highly stereoregular polymer is provided, which component comprises a solid product (II) obtained by reacting Mg compound(s) of formula $MgR^1R^2$ (wherein $R^1$ is alkyl, aryl, alkoxy or aryloxy and $R^2$, alkyl, aryl, alkoxy, aryloxy or halogen), with a complex of compound(s) selected from Al halides and Al compounds of formula $AlR_n{}^3X_{3-n}$ (wherein $R_3$ is alkyl, aryl, alkoxy or aryloxy; X, halogen; $0 \leq n < 2$) with an organic acid ester; and reacting the resulting solid product (I) (a carrier) with a liquid halogen-containing Ti compound. Preactivation of the solid product (II) with an organoaluminum compound and an α-olefin affords a catalyst component superior in storage stability and polymerization reproducibility.

13 Claims, No Drawings

CATALYST COMPONENT FOR α-OLEFIN POLYMERIZATION

BACKGROUND OF THE INVENTION

1. Field of the Invention

This invention relates to a catalyst component for α-olefin polymerization. Particularly it relates to a catalyst component for α-olefin polymerization, obtained by having a titanium compound supported on a novel carrier by reacting the compound with the carrier.

2. Description of the Prior Art

Supported type catalyst components for α-olefin polymerization have been studied over many years in order to, when used for the polymerization, improve the yield of poly-α-olefins per unit weight of transition metal catalyst components as much as possible, and also produce poly-α-olefins having good form, stereoregularity and other physical properties. Many of the carriers used for the catalyst components have been obtained by subjecting substances which are solid from the beginning to milling, mix-milling, mix-milling-and-burning or the like. In recent years, however, catalyst components for α-olefin polymerization or carriers for catalysts for the polymerization have been introduced which are obtained by mixing and reacting two kinds or more of liquid substances or a liquid substance or substances and a solid substance to obtain a solid substance (carrier), which is then reacted with a transition metal compound (see e.g. Japanese patent application laid-open Nos. Sho 55-29591 and Sho 55-135102(1980)). The steps of producing these catalyst components (or carriers) do not include either step of mix-milling or mix-milling-and-burning two kinds or more of solid raw materials. This fact is presumed to have aimed at improving the form of poly-α-olefins (particle diameter, particle size distribution and bulk density) indirectly affected by the form of the catalyst, by reducing the content of fine powder including solids which may form fine powder in the catalyst components. The direct object, however, is as in the past to maximize the yield of poly-α-olefins per the unit weight of the transition metal catalyst components obtained by utilizing the above-mentioned catalyst components, and also minimize the amount of atactic poly-α-olefin byproduced.

Further, Japanese patent application laid-open No. Sho 56-115301 (1981) discloses that as a Ti catalyst component used for α-olefin stereoregular polymerization process, a substance is used which is obtained by reacting a magnesium compound expressed by the general formula $Mg(OR^1)_n X^1_{2-n}$ with an aluminum halide expressed by the general formula $AlX_3{}^2$ and during or after the reaction, treating the reaction materials with an organic acid ester to obtain a carrier which is then reacted with a halogen-containing tetravalent Ti compound of the general formula $Ti(OR^3)_m X_{4-m}{}^3$. Such an invention also aims at improving the catalyst activity and the stereoregularity of polymers.

The present inventors have made strenuous studies on a supported type catalyst component which has a higher activity and can produce a poly-α-olefin polymer having a higher stereoregularity than those of the above-mentioned prior inventions, and as a result have found that if a magnesium compound within a broader range of kinds of magnesium compounds than those disclosed in the above-mentioned Japanese patent application laid-open No. Sho 56-115301 (1981), expressed by the general formula $MgR^1R^2$ (wherein $R^1$ represents alkyl, aryl, alkoxy or aryloxy group and $R^2$ represents alkyl, aryl, alkoxy, aryloxy group or halogen atom) is reacted with a complex compound of ① one kind or more of compounds selected the group consisting of aluminum halides and aluminum compounds having the general formula $AlR_n{}^3 X_{3-n}$ (wherein $R_3$ represents alkyl, aryl, alkoxy or aryloxy group, X represents halogen atom and n represents a number of $0 \leq n < 2$) with ② an organic acid ester, and the resulting solid product (I) is used as a carrier, then reaction of this carrier with a liquid halogen-containing titanium compound within a far broader range than the range of those disclosed in the above-mentioned laid-open Japanese patent application i.e. those expressed by the general formula $Ti(OR^3)_m X_{4-m}{}^3$, affords a catalyst component for α-olefin polymerization having a higher activity and capable of producing poly-α-olefins having a higher stereoregularity. Thus a first aspect of the present invention has been completed.

Further we have found that if this catalyst component of the first aspect of the present invention is preactivated by combining it with an organoaluminum compound and an α-olefin, it is possible to obtain a catalyst component which is superior in the storage stability and polymerization reproducibility to the above one (a second aspect of the present invention).

As is apparent from the foregoing, an object of the present invention is to provide a catalyst component for α-olefin polymerization, supported on a carrier which does not require mix-milling, and having a high activity and also capable of producing poly α-olefins having a high stereoregularity. Another object of the present invention is to provide a catalyst component having a carrier for which the raw material can be selected from among a broad range of raw materials and also capable of being easily prepared.

SUMMARY OF THE INVENTION

The present invention has the following aspects (1) to (8):

(1) A catalyst component for α-olefin polymerization comprising a solid product (II) obtained by reacting a magnesium compound or compounds selected from among those expressed by the general formula $MgR^1R^2$ (wherein $R^1$ represents alkyl, aryl, alkoxy or aryloxy group and $R^2$ represents alkyl, aryl, alkoxy, aryloxy group or halogen atom), with a complex compound of ① an aluminum compound or compounds selected from the group consisting of aluminum halides and aluminum compounds expressed by the general formula $AlR_n{}^3 X_{3-n}$ (wherein $R_3$ represents alkyl, aryl, alkoxy or aryloxy group, X represents a halogen atom and n represents a number of $0 \leq n < 2$) with ② an organic acid ester, to obtain a solid product (I); and reacting this solid product (I) with a liquid halogen-containing titanium compound.

(2) A catalyst component for α-olefin polymerization comprising a solid product (III) obtained by reacting a magnesium compound or compounds selected from among those expressed by the general formula $MgR^1R^2$ (wherein $R^1$ represents alkyl, aryl, alkoxy or aryloxy group and $R^2$ represents alkyl, aryl, alkoxy, aryloxy group or halogen atom), with a complex compound of ① an aluminum compound compounds selected from the group consisting of aluminum halides and aluminum compounds having the general formula $AlR_n{}^3 X_{3-n}$ (wherein $R^3$ represents alkyl, aryl, alkoxy or aryloxy group, X represents a halogen atom and n represents a number of $0 \leq n < 2$) with ② an organic acid ester, to obtain a solid product (I);

reacting this solid product (I) with a liquid halogen-containing titanium compound, to obtain a solid product (II); and preactivating this solid product (II) in combination with an organoaluminum compound and an α-olefin.

(3) A catalyst component according to the aspect (1) or the aspect (2) wherein said organic acid ester is an ester of an aliphatic or aromatic mono-, di- or tri-carboxylic acid of 1 to 20 carbon atoms with an aliphatic or aromatic mono-, di- or tri-alcohol of 1 to 20 carbon atoms, and does not contain any free carboxyl group or alcohol group.

(4) A catalyst component according to the aspect (1) or the aspect (2) wherein said complex compound is obtained by reacting an aluminum halide or an aluminum compound expressed by the general formula $AlR_n^3X_{3-n}$ with an organic acid ester, in a mol ratio of the former to the latter of 1:0.1 to 10, at 0° to 100° C. for 5 minutes to 5 hours.

(5) A catalyst component according to the aspect (1) or the aspect (2) wherein said solid product (I) is obtained by reacting said magnesium compound or compounds expressed by the general formula $MgR^1R^2$ with said complex compound in a ratio by weight of the former to the latter of 1:0.05 to 5, at −10° C. to +150° C. and for 0.5 to 6 hours.

(6) A catalyst component according to the aspect (1) or the aspect (2) wherein said solid product (II) is obtained by reacting said solid product (I) with said liquid halogen-containing titanium compound in an amount of 1 to 100 ml per g of said product (I), at 50° C. to 200° C. for 0.5 to 6 hours.

(7) A catalyst component according to the aspect (2) wherein said solid product (II) is preactivated with 0.1 to 500 g of an organoaluminum compound, 0.05 to 20 g of an electron donor, 0.05 to 1,000 g of an α-olefin, 0 to 1,000 ml of hydrogen and 0 to 80 l of a solvent, each per g of the solid product (II), at 0° C. to 100° C. for one minute to 20 hours.

(8) A catalyst component according to the aspect (1) or the aspect (2) wherein said solid product (I) is mixed with silicon tetrachloride in an amount of 1 to 1,000 ml per g of the product (I), and the mixture is treated at 20° C. to 150° C. for 10 minutes to 12 hours and then reacted with said liquid halogen-containing titanium compound.

DESCRIPTION OF THE PREFERRED EMBODIMENTS (i) Mg compounds of the general formula $MgR^1R^2$ used in the present invention:

$R^1$ represents alkyl, aryl, alkoxy or aryloxy group of 1 to 14 carbon atoms and $R^2$ represents alkyl, aryl alkoxy or aryloxy group of 1 to 14 carbon atoms or halogen atom. Concrete examples thereof are dialkylmagnesiums such as ethyl.n-butylmagnesium, di-n-butylmagnesium, sec-butyl.n-butylmagnesium and di-n-octylmagnesium, diarylmagnesiums such as diphenylmagnesium, dialkoxymagnesiums such as dimethoxymagnesium, diethoxymagnesium and dioctoxymagnesium, diaryloxymagnesiums such as diphenyloxymagnesium and dinaphthyloxymagnesium. Further, examples of halogen-containing compounds are the so-called Grignard compounds such as ethylmagnesium chloride, n-butylmagnesium chloride, sec-butylmagnesium chloride. Examples of alkoxymagnesium halides are methoxymagnesium chloride, ethoxymagnesium chloride and n-butoxymagnesium chloride. These compounds are reacted with complex compounds used in the present invention, as mentioned later, in the manner as mentioned later.

(ii) Aluminum halides or aluminum compounds of the general formula $AlR_n^3X_{3-n}$ used in the present invention:

$R^3$ represents alkyl, aryl, alkoxy or aryloxy group of 1 to 14 carbon atoms, X represents halogen atom and n represents $0 \leq n < 2$. Concrete examples thereof are anhydrous aluminum halides such as $AlCl_3$, $AlBr_3$ and $AlI_3$, alkyl halides of the above general formula containing at least one halogen atom such as methylaluminum dichloride, dimethylaluminum chloride, ethylaluminum dichloride, diethylaluminum chloride and di-n-octylaluminum chloride, aryl halides such as phenylaluminum dichloride and alkoxy halides such as ethoxyaluminum dichloride and diethoxyaluminum chloride.

(iii) Organic acid esters used in the present invention:

Organic acids constituting the organic acid esters are aliphatic or aromatic carboxylic acids of 1 to 20 carbon atoms. Not only monocarboxylic acids but also di- and tri-carboxylic acids and further oxycarboxylic acids and ether carboxylic acids may be used. Alkohols constituting the esters are aliphatic or aromatic alcohols of 1 to 20 carbon atoms. Not only monoalcohols but also dialcohols such as glycohols and trialcohols such as glycerol may be used. Concrete examples of the esters are carboxylic acid alkyl esters such as butyl formate, ethyl acetate, amyl acetate, vinyl acetate, methyl methacrylate, etc. and esters of aromatic acids such as ethyl benzoate, propyl benzoate, butyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, propyl naphthoate, butyl naphthoate, 2-ethylhexyl naphthoate, ethyl phenylacetate, etc.

(iv) Complex compounds of (ii) the aluminum compounds with (iii) the organic acid esters:

Both the components themselves or those dissolved or suspended in a suitable amount of an inert solvent are reacted together at a temperature of 0° C. to 100° C., preferably 20° C. to 80° C. for 5 minutes to 5 hours, preferably 10 minutes to 2 hours in an inert gas atmosphere. The mol ratio of the former (aluminum compounds) to the latter (organic acid esters) is 1:0.1 to 10, preferably 1:0.5 to 5. The resulting reaction mixture (complex), as it is, or after separation of the inert solvent, is reacted with a magnesium compound of the general formula $MgR^1R^2$ as described in the following item (v). Among such complexes, particularly a complex of $AlCl_3$ with ethyl benzoate or that of $AlC_2H_5Cl_2$ with ethyl benzoate may be preferably used. When the complexes are reacted with Mg compounds as described in the following item (v), they may be preferably suspended or dissolved in an inert organic solvent.

(v) Preparation of the solid product (I) used in the present invention:

The Mg compounds of the general formula $MgR^1R^2$ described in the item (i) are reacted with the complexes of the aluminum halides or the compounds of the general formula $AlR_n^3X_{3-n}$ with the organic acid esters, described in the item (ii) under the following conditions to obtain the solid product (I):

The two kinds of compounds are used in a ratio by weight of the latter to the former of 0.05 to 5:1, preferably 0.1 to 1.0:1. As to the mixing manner for the reaction, when the two are both solid, it is possible to react them together as they are, but since this requires mix-milling, they may be reacted together both in suspension state or either one or both in solution state, by the use of an inert solvent or suspending agent. The reaction is carried out at −10° C. to 150° C., preferably 0° C. to 100° C., for 0.5 to 6 hours, preferably 1 to 3 hours. The two may be mixed together each in the total amount from the beginning of the reaction, or one of the two may be successively added to another during the reaction. Thus a reaction product is obtained which is the solid product (I) of the present invention. The solid product (I) is recovered by filtering off the suspending agent, washing with an inert solvent and drying, but the reaction mixture after completion of the reaction may be, as it is, subjected to the succeeding reaction with a liquid halogen-containing titanium compound (i.e. the reaction for the first aspect of the present invention). In addition, as described above in the item (8), it is also possible to treat the solid product (I) with $SiCl_4$ in advance of reacting the product (I) with a liquid halogen-containing titanium compound, and the catalyst component of the present invention obtained after passing through such a treatment has an improved polymerization activity and a reduced atactic index over the catalyst component obtained without the treatment. Such a treatment with $SiCl_4$ is particularly effective when the content of Ti in the solid product (I) is as high as e.g. 30 mg/g or higher (see Table 3 mentioned later).

(vi) Preparation of the solid product (II) of the first aspect of the present invention:

The solid product (I) obtained in the above item (v) is reacted with a liquid halogen-containing titanium compound as follows:

The liquid halogen-containing Ti compounds used are compounds expressed by the general formula $Ti(OR)_qX_{4-q}$ wherein R represents alkyl, aryl or cycloalkyl group of 1 to 10 carbon atoms, X represents halogen atom and q represents a number of 0 to 3.0). Concrete examples thereof are $TiCl_4$, titanium chloride isopropoxides such as $Ti(OC_3H_7-i)Cl_3$, $Ti(OC_3H_7-i)_2Cl_2$ and $Ti(OC_3H_7-i)_3Cl$ and titanium chloride n-butoxides such as $Ti(OC_4H_9-n)Cl_3$, and $TiCl_4$ is preferably used. As to the reaction conditions, the former (solid product (I)) is treated with the latter (liquid halogen-containing Ti compound) in an amount of 1 to 100 ml, preferably 5 to 20 ml per g of the former, at 50° to 200° C., preferably 80° to 130° C. and for 0.5 to 6 hours, preferably 0.5 to 3 hours. This treatment may be carried out either by directly contacting the two with one another, or by using the latter after diluted in an inert organic solvent. The treatment may be carried out not only once but also twice or more e.g. about 10 times. Further, as described above in the item (v), the reaction mixture having the former mixed in a suspending agent may be used as it is, and when an inert organic solvent is used in an amount of 1 to 100 ml, preferably 5 to 50 ml per g of the solid product (I) in the treatment, it is possible to obtain a catalyst component (solid product (II)) having a superior polymerization activity with a good reproducibility. By the above treatment is formed a solid product (II), which is recovered after completion of the treatment by removing the liquid portion by filtering off, removal of the supernatant or distilling off, washing with a solvent, and then suspending in a solvent added again or drying. The resulting solid product (II) of the present invention is combined with an organoaluminum compound and used as a catalyst for α-olefin polymerization.

(vii) Preparation of the solid product (III) of the second aspect of the present invention:

From the solid product (II) is prepared the solid product (III) according to the following preactivation: The latter also is a catalyst component for α-olefin polymerization used alike the former, but has advantages such that its storage stability as a catalyst component is superior to that of the former.

The solid product (II) is combined with an organoaluminum compound (E) and a small amount of an α-olefin. It is also possible to employ an embodiment of combining it further with hydrogen, an electron donor (C) and an inert organic solvent (hereinafter abbreviated to solvent) in addition to the above-mentioned two. The organoaluminum compounds (E) are expressed by the general formula $Al_nR^4X_{3-n}$ wherein $R^4$ represents same or different alkyl, aryl, alkylaryl or alkoxy group each of 1 to 14 carbon atoms, X represents halogen atom and n represents a number of 1 to 3. Concrete examples thereof are trialkylaluminums such as trimethylaluminum, triethylaluminum, tri-n-propylaluminum, tri-i-butylaluminum, tri-n-hexylaluminum, tri-i-hexylaluminum, tri-2-methyl-pentylaluminum, tri-n-octylaluminum, tri-n-decylaluminum, etc., diethylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride, etc., alkylaluminum sesquihalides such as methylaluminum sesquichloride, ethylaluminum sesquichloride, etc., alkoxyalkylaluminums such as monoethoxydiethylaluminum, diethoxymonoethylaluminum, etc.

As the electron donor capable of being optionally combined in the preparation of the solid product (III), it is possible to use compounds of 1 to 20 carbon atoms containing at least one atom of O, N, P or S in one molecule, besides the above-mentioned organic acid esters, that is, ethers, alcohols, aldehydes, fatty acids, ketones, nitriles, amines, amides, ureas or thioureas, isocyanates, azo compounds, phosphines, phosphites, phosphinites, thioethers, thioalcohols, etc. Concrete examples are ethers such as diethyl ether, di-n-propyl ether, di-n-butyl ether, di(isoamyl) ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran, and the like; alcohols such as methanol, ethanol, propanol, butanol, pentanol, hexanol, octanol, phenol, cresol, xylenol, ethylphenol, naphthol and the like; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, succinic acid, acrylic acid, maleic acid, benzoic acid and the like; ketones such as methyl ethyl ketone, methyl isobutyl ketone, benzophenone and the like; nitriles such as acetonitrile, amines such as methylamine, diethylamine, tributylamine, triethanolamine, $\beta$(N,N-dimethylamino)ethanol, pyridine, quinoline, $\alpha$-picoline, N,N,N',N'-tetramethylhexaethylene diamine, aniline, dimethylaniline and the like; amides such as formamide, hexamethylphosphoric acid triamide, N,N,N',N',N''-pentamethyl-N-$\beta$-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azo-compounds such as azobenzene and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite and the like; thioethers such as diethyl thioether, diphenyl thioether, methyl phenyl thioether, ethylene sulfide, propylene sulfide and the like; and thioalcohols such as ethylthioalcohol, n-propylthioalcohol, thiophenol and the like. These electron donors may be used in admixture. The preactivation reaction is carried out using 0.1 to 500 g of an organoaluminum compound (E), 0 to 20 g of an electron donor (C), 0.01 to 5,000 g, preferably 0.05 to 1,000 g of an $\alpha$-olefin, 0 to 1,000 ml of hydrogen and 0 to 80 l of a solvent, each per g of the solid product (II), at 0° to 100° C., for one minute to 20 hours, to react the $\alpha$-olefin in an amount of 0.01 to 500 g per g of the solid product (II). The kinds of the $\alpha$-olefin and the solvent used in the reaction are the same as those used for $\alpha$-olefin polymerization wherein the catalyst component of the present invention as described later is used.

The above reaction is completed when the solid product (III) has been formed after completion of addition of all raw materials to be used in various embodiments as mentioned later, and after lapse of necessary reaction time. Besides the above-mentioned raw materials, it is also possible to use as a particular raw material, a powdery $\alpha$-olefin polymer in an amount of 1 to 5,000 g per g of the solid product (II). The purpose of its use is to make the resulting catalyst component of the present invention bulky whereby the component is easily used. The solvent, organoaluminum compound (E), electron donor (C) and unreacted $\alpha$-olefin used in the preactivation are removed after completion of the reaction, by operation of purging with inert gas, filtration, centrifugal separation, distilling off under reduced pressure or the like to obtain a solid product (III) in the form of dry powder. According to another embodiment, the solvent, organoaluminum compound (E) and electron donor (C) used are not separated, and preferably a solvent is added or additionally added in an amount of 80 l or less per g of the solid product (III), whereby it is possible to prepare the solid product (III) or a catalyst for $\alpha$-olefin polymerization containing the solid product (III) as its effective component, each in the form of slurry.

Five embodiments directed to the using manner and addition order of the raw materials used for preparing the solid product (III) from the solid product (II) will be additionally described.

① The solid product (II), organoaluminum compound (E) and electron donor (C) are mixed, followed by adding the $\alpha$-olefin (F).

② (F) is placed in the reactor in advance, followed by adding solid product (II), (E) and (C) in an optional order.

③ The solid product (II) is mixed with (E), followed by adding (F) and lastly (C).

④ The solid product (II), (E) and (C₁) (a portion of (C)) are introduced into a reaction vessel and mixed in an optional order, followed by adding (F) and lastly (C₂) ((C₁) and (C₂) being same or different compounds).

⑤ The solid product (II), (E) and (C₁) are introduced and mixed in any order, followed by adding (F₁) (a portion of (F)) and then (C₂) and (F₂) (F₁ and F₂ being same or different $\alpha$-olefins).

A solvent or an $\alpha$-olefin polymer may be used in these embodiments, if necessary, and an embodiment without using an electron donor (C) may be employed, although these facts have not been referred to in the above embodiments. Necessary agitation is carried out during the mixing, addition or reaction. The mixing or addition is carried out at 20° to 100° C. for 5 minutes to 5 hours, and after completion of reaction of (F), or when either one of the raw materials which has been later in completion of addition has been completely added, the preactivation is completed. Among the above embodiments ① ~ ⑤, those ③ ~ ⑤ afford a superior catalyst component.

The thus obtained catalyst component or preactivated catalyst component is used for producing $\alpha$-olefin polymers.

The catalyst component of the present invention, when used in combination with an organoaluminum compound (E), can be used in either of slurry polymerization carried out in a hydrocarbon solvent such as n-hexane, n-heptane, etc. or bulk polymerization carried out in a liquefied $\alpha$-olefin such as liquefied propylene, liquefied butene, etc. In the present invention, since the catalyst has a high activity, a notable effectiveness is exhibited particularly in the case of gas phase polymerization wherein an $\alpha$-olefin such as propylene is polymerized in gas phase, and a desirable effectiveness is also exhibited in a process as a modification of gas phase polymerization, of slurry polymerization followed by gas phase polymerization or a modified process of bulk polymerization followed by gas phase polymerization.

Gas phase polymerization of $\alpha$-olefins may be carried out not only in the absence of a solvent such as n-hexane, n-heptane, etc., but also in the presence of a solvent of 0 to 500 g per kg of particles of $\alpha$-olefin polymers, and either of continuous polymerization or batch polymerization may be employed. Gas phase polymerization may be also carried out in any manner of fluidized bed, fluidization equipped with agitation elements or vertical or horizontal type paddle agitation.

The process of slurry or bulk polymerization followed by gas phase polymerization, as a modification of $\alpha$-olefin gas phase polymerization, may be carried out either batchwise or continuously. For example, (1) a process wherein after polymerization in a solvent such as n-hexane (slurry polymerization) or polymerization in a liquefied $\alpha$-olefin (bulk polymerization) has been carried out, the solvent or liquefied $\alpha$-olefin is removed and successively a gaseous $\alpha$-olefin is fed to carry out gas phase polymerization; (2) a process wherein slurry or bulk polymerization is carried out and the $\alpha$-olefin polymerization is continued without removing the solvent or $\alpha$-olefin used in the polymerization so that the solvent or $\alpha$-olefin is occluded in the resulting polymer particles and no liquid portion remains, that is, the above polymerization moves continuously to gas phase polymerization; (3) a process wherein an α-olefin is fed in gas phase to catalyst-containing polymer particles having 500 g or less of a solvent or liquefied α-olefin per kg of the particles contained therein, to effect gas phase polymerization; etc. Plural stage polymerizations consisting of a combination of slurry or bulk polymerization with gas phase polymerization afford desirable results particularly in continuous polymerization. The process of plural stage polymerizations includes a process wherein slurry or bulk polymerization of an α-olefin is carried out at the first stage and continued till the resulting polymer particles contain 30% or less by weight of a solvent or liquefied α-olefin used in the polymerization, or the solvent or liquefied α-olefin is removed, followed by carrying out gas phase polymerization at the second stage while fluidizing the resulting polymer particles. In the gas phase polymerization at the second stage, the catalyst of the former stage is used as it is, but even when a fresh catalyst is added at the second stage, the effectiveness of the present invention is not hindered thereby. In this case, it is preferred to carry out the polymerization so as to give a ratio by weight of slurry or bulk polymerization to gas phase one of 1:0.1 to 100.

As to the polymerization conditions of α-olefins, any of the slurry, bulk and gas phase polymerizations are carried out at a polymerization temperature of room one (20° C.) to 200° C., under a polymerization pressure of ordinary pressure (0 kg/cm$^2$G) to 50 kg/cm$^2$G and usually for a period of about 5 minutes to 10 hours. Addition of an adequate amount of hydrogen and the like means in the polymerizations are the same as those in conventional polymerization processes.

α-Olefins used in the present invention include straight chain monoolefins such as ethylene, propylene, butene-1, hexene-1, octene-1, etc., branched chain monoolefins such as 4-methyl-pentene-1, 2-methyl-pentene-1, 3-methyl-butene-1, etc., diolefins such as butadiene, isoprene, chloroprene, etc. and styrene. According to the process of the present invention, it is possible to carry out not only homopolymerization of these polyolefins, but also copolymerization in a combination thereof with each other e.g. propylene with ethylene, butene-1 with ethylene, propylene with butene-1, etc. Further, in the plural stage polymerizations, α-olefins used in the first stage slurry or bulk polymerization may be the same as or different from those used in the second stage gas phase polymerization.

The present invention will be further described by way of the following Examples and Comparative examples.

EXAMPLE 1

(i) Preparation of solid product (II):

Into a 500 ml three-neck flask was introduced a heptane solution (100 ml) of n-butyl,sec-butylmagnesium (concentration: 14.2% by weight), to which the total quantity of a solution obtained by dissolving a complex (16.7 g) of anhydrous AlCl$_3$ with ethyl benzoate (i.e. a reaction product obtained by reacting the both at 25° C. for 180 minutes) in 1,1,2-trichloroethane (250 ml) was dropwise added with stirring at a reaction temperature of 0° C. over 30 minutes. After the addition, the reaction mixture was kept at 0° C. for 30 minutes, followed by raising the temperature up to 80° C. and then reacting it for one hour. The resulting solids were separated by filtering at room temperature, followed by 5 times washing with n-hexane (each time 50 ml) and drying under reduced pressure (5 mm Hg) at room temperature for one hour to obtain a solid product (I). This solid product (I) (5.0 g) and TiCl$_4$ (100 ml) were added to a 300 ml three-neck flask and agitated to suspend the former in the latter, followed by keeping the resulting suspension at 110° C. for one hour. The reaction mixture was then allowed to stand to remove the supernatant and thereby remove unreacted TiCl$_4$, followed by again adding TiCl$_4$ (100 ml), keeping the resulting suspension state at 110° C. for 1.5 hour, again allowing it to stand and removing the supernatant to thereby remove the TiCl$_4$ portion in the reaction mixture, three times removing the portion with n-hexane (each time 100 ml), separating by filtration and washing the resulting reaction mixture, and drying the resulting solids under reduced pressure (5 mmHg) at room temperature for one hour to obtain a solid product (II) of the present invention which had a Ti atom content of 29.2 mg per g of the solid product (II).

(ii) Propylene polymerization:

Into a 1.5 l capacity stainless steel autoclave purged with nitrogen gas were introduced n-hexane (1,000 ml), triethylaluminum (4.0 m mol), methyl p-toluylate (hereinafter abbreviated to MPT)(0.6 m mol), the solid product (II) obtained at the above step (i)(70 mg) and hydrogen (100 ml), followed by forcing propylene into the autoclave, raising the temperature up to 60° C. and then carrying out suspension polymerization with stirring while keeping the propylene partial pressure at 6 kg/cm$^2$G for one hour. After the polymerization, unreacted propylene was released and recovered and methanol (5 ml) was added to the polymerization vessel to carry out killing reaction at 60° C. for 10 minutes, followed by cooling the polymerization mixture down to room temperature, filtering off the resulting solid part and drying to obtain a n-hexane-insoluble polymer. On the other hand, the filtrate was vaporized and concentrated to dryness to obtain a n-hexane-soluble polymer. With these polymers, atactic index was calculated according to the following equation:

$$\text{Atactic index} = \frac{\text{n-hexane-soluble polymer (g)} \times 100}{\text{n-hexane-soluble polymer (g)} + \text{n-hexane-insoluble polymer (g)}} \quad (1)$$

The polymerization results are shown in Table 1.

EXAMPLE 2

(i) Preparation of solid product (II):

Into a 500 ml three-neck flask were introduced Mg diethoxide (5.0 g) and toluene (100 ml), to which the total quantity of a solution obtained by dissolving a complex (9.8 g) of ethylaluminum dichloride (DEAC) with ethyl benzoate (i.e. a reaction product obtained by reacting the both at 25° C. for 180 minutes) was dropwise added with stirring at room temperature over 30 minutes, followed by keeping the reaction mixture at room temperature for 30 minutes, then raising the temperature up to 100° C. to effect reaction for one hour. Thereafter the same procedure as in Example 1 (i) was taken to obtain a solid product (II) having a Ti atom content per g of the product (II) of 21.4 mg.

(ii) Propylene polymerization:

Example 1 was repeated (slurry polymerization). The results are shown in Table 1.

COMPARATIVE EXAMPLE 1

(i) Preparation of solid product (II):

Example 1 was repeated except that n-butyl, sec.-butylmagnesium was replaced by anhydrous $MgCl_2$ (9.5 g), to obtain a solid product (II) having a Ti atom content per g of the product (II) of 4.5 mg.

(ii) Propylene polymerization:

Example 1 was repeated (slurry polymerization). The results are shown in Table 1.

COMPARATIVE EXAMPLE 2

(i) Preparation of solid product (II):

Example 1 was repeated except that the complex of $AlCl_3$ with ethyl benzoate was replaced by ethyl benzoate (5.1 mg), to obtain a solid product (II) having a Ti atom content per g of the product (II) of 50.8 mg.

(ii) Propylene polymerization:

Example 1 was repeated (slurry polymerization). The results are shown in Table 1.

TABLE 1

| | Solid product (II) and polymerization results | | | |
|---|---|---|---|---|
| | Ti atom | Yield of n-hexane-insoluble polymer | | |
| Example or Compar. ex | content in solid product (II) (Ti mg/g) | per g of solid product (II) (g/g) | per mg of Ti atom (g × 10³/mg) | Atactic index |
| Example 1 | 29.2 | 2360 | 80.8 | 7.5 |
| Example 2 | 21.4 | 3030 | 141.6 | 6.8 |
| Comp. ex. 1 | 4.5 | 250 | 55.6 | 28.3 |
| Comp. ex. 2 | 50.8 | 620 | 12.2 | 31.7 |

EXAMPLE 3

(i) Preparation of solid product (II):

A portion of the solid product (II) obtained in Example 1 was used at the following step.

(ii) Preparation of solid product (III) and propylene polymerization:

Into a 1.5 l capacity autoclave were introduced n-hexane (1,000 ml), triethylaluminum (4.0 m mol), MPT (0.6 m mol) and the solid product (II) obtained in Example 1 (70 mg), followed by feeding propylene under a propylene partial pressure of 0.5 kg/cm²G at room temperature to effect reaction for 30 minutes for preactivation to prepare a solid product (III). Next, hydrogen (100 ml) was introduced into the catalyst system containing the solid product (III) to carry out slurry polymerization under a propylene partial pressure of 6 kg/cm²G at 60° C. for one hour. The subsequent procedure was the same as in Example 1. The results are shown in Table 2. As apparent from comparison of this Table with Table 1 (Example 1), although the yield of n-hexane-insoluble polymer is somewhat reduced (about 9%) by the above-mentioned preactivation, the atactic index is notably reduced down to about 61% of the original.

EXAMPLE 4

(i) Preparation of solid product (II):

Example 1 (i) was repeated except that the heptane solution of n-butyl, sec-butylmagnesium was replaced by a heptane solution (53 ml) of n-butyl, ethylmagnesium (concentration: 21.4 wt. %), to obtain a solid product (II) having a Ti atom per g of the product (II) of 27.1 mg/g.

(ii) Preparation of solid product (III) and propylene polymerization:

Preparation of solid product (III) (preactivation) and propylene slurry polymerization were carried out as in Example 3. The results are shown in Table 2.

EXAMPLE 5

(i) Preparation of solid product (II):

Example 1 was repeated except that the heptane solution of n-butyl, sec-butylmagnesium was replaced by n-butylmagnesium chloride (15.0 g) (obtained by subjecting its tetrahydrofurane solution to concentration under reduced pressure to dryness) and 1,1,2-trichloroethane (100 ml), to obtain a solid product (II) having a Ti atom content per g of the product (II) of 24.7 mg/g.

(ii) Preparation of solid product (III) and propylene polymerization:

Preparation of solid product (III) (preactivation) and propylene slurry polymerization were carried out as in Example 3. The results are shown in Table 2.

EXAMPLE 6

(i) Preparation of solid product (II):

Into a 500 ml three-neck flask were introduced Mg diethoxide (5.0 g) and toluene (100 ml), to which the total quantity of a solution obtained by dissolving a complex (10.0 g) of anhydrous $AlCl_3$ with ethyl benzoate (prepared under the same conditions as in Example 1) in toluene (250 ml) was dropwise added with stirring at room temperature over 30 minutes, followed by keeping the reaction mixture at room temperature for 30 minutes and successively raising the temperature up to 100° C. to effect reaction for one hour. The subsequent procedure was carried out as in Example 1 (i) to obtain a solid product (II) having a Ti atom content per g of the product (II) of 22.5 mg/g.

(ii) Preparation of solid product (III) and propylene slurry polymerization:

Propylene slurry polymerization was carried out as in Example 3 (ii) except that the solid product (II) obtained in the above step (i) was used. The results are shown in Table 2.

(iii) Preparation of solid product (III) and propylene gas phase polymerization:

Into a 2.0 l capacity autoclave were introduced n-hexane (10 ml), triethylaluminum (2.0 m mol) and the above solid product (II), (18 mg), and propylene was fed to the mixture at room temperature for 10 minutes, followed by keeping the propylene partial pressure at 1 kg/cm²G and then adding MPT (0.4 m mol) for preactivation to prepare a solid product (III).

Next, hydrogen (300 ml) was introduced into the catalyst system containing the above solid product (III) and gas phase polymerization was conducted under a propylene partial pressure of 25 kg/cm²G at 70° C. for 2 hours, followed by releasing and recovering unpolymerized propylene and adding methanol (5 ml) into the vessel to carry out killing reaction at 70° C. for 10 minutes. The polymerization mixture was then cooled down to room temperature and dried under reduced pressure to obtain a white polymer (219 g). The polymer yield was 121.70 g per g of the solid product (II). Further, the dried polymer (10 g) was subjected to extraction treatment with stirring in n-hexane (200 ml) at 20° C. for 48 hours to obtain n-hexane-soluble and-insoluble polymers. The atactic index calculated from the amounts of these polymers according to the above-mentioned equation (1) was 3.1.

EXAMPLE 7

(i) Preparation of solid product (II):

Example 6 (i) was repeated except that Mg diethoxide (15.0 g) was replaced by Mg phenoxide (9.3 g), to obtain a solid product (II).

(ii) Preparation of solid product (III) and propylene slurry polymerization:

Into a 1.5 l capacity autoclave were introduced hexane (1,000 ml), triethylaluminum (4.0 m mol) and the above solid product (II) (2.0 g), followed by feeding propylene at room temperature (20° C.) and keeping the propylene partial pressure at 1 kg/cm$^2$G for 10 minutes for preactivation. After the preactivation, unreacted propylene gas was released, followed by filtering off and drying to obtain a solid product (III) having a Ti atom content per g of the product (III) of 10.8 mg/g. Propylene slurry polymerization was carried out as in Example 1 except that the above solid product (III) (117.3 mg) was used. The results are shown in Table 2.

(iii) Preparation of solid product (III) and propylene gas phase polymerization:

Propylene gas phase polymerization was carried out as in Example 6 (ii) except that the solid product (II) (19 mg) obtained in the above step (i) was used, to obtain a white dry polymer (207 g). The total polymer yield i.e. the polymer yield per g of the solid product (II) was 10890 g. Further the atactic index was 4.7.

EXAMPLE 8

(i) Preparation of solid product (II):

A portion of the solid product (II) obtained in Example 2 was used at the following step.

(ii) Preparation of solid product (III) and propylene slurry polymerization:

Preparation of solid product (III), (preactivation) and propylene slurry polymerization were carried out as in Example 3 except that the solid product (II) obtained in the above step (i) was used. The results are shown in Table 2.

(iii) Preparation of solid product (III) and propylene gas phase polymerization:

Propylene gas phase polymerization was carried out as in Example 6, using the solid product (II) (18 mg) obtained in the above step (i), to obtain a white dry polymer (233 g). The total polymer yield i.e. the polymer yield per g of the solid product (II) was 12940 g. Further the atactic index was 3.3.

EXAMPLES 9 AND 10

(i) Preparation of solid product (II):

Example 6 was repeated except that the complex (10 g) of anhydrous AlCl$_3$ with ethyl benzoate was replaced by the following complexes (10.0 g), to obtain the corresponding solid products (II):

In Example 9, an equimolecular complex of anhydrous AlCl$_3$ with ethyl p-anisate (prepared under the same conditions as in Example 1) was used, and in Example 10, an equimolecular complex of anhydrous AlCl$_3$ with ethyl o-toluylate (prepared under the same conditions as in Example 1) was used. The Ti atom contents in the respective solid products were 31.4 mg/g (Example 9) and 27.3 mg/g (Example 10).

(ii) Preparation of solid product (III) and propylene slurry polymerization:

Propylene slurry polymerization was carried out as in Example 6 except that the respective solid products (II) obtained in the above step (i) were used. The results are shown in Table 2.

COMPARATIVE EXAMPLE 3

(i) Preparation of solid product (II):

Example 6 was repeated except that Mg diethoxide was replaced by anhydrous MgCl$_2$ (9.5 g), to obtain a solid product (II) having a Ti atom content per g of the product (II) of 4.1 mg/g.

(ii) Preparation of solid product (III) and propylene slurry polymerization:

Propylene slurry polymerization was carried out as in Example 6. The results are shown in Table 2.

COMPARATIVE EXAMPLE 4

(i) Preparation of solid product (II):

Example 6 was repeated except that the complex (10.0 g) of anhydrous AlCl$_3$ with ethyl benzoate was replaced by ethyl benzoate (5.1 ml), to obtain a solid product (II) having a Ti atom content per g of the product (II) of 42.7 mg/g.

(ii) Preparation of solid product (III) and propylene slurry polymerization:

Propylene slurry polymerization was carried out as in Example 6. The results are shown in Table 2.

TABLE 2

| | Preactivated solid product (II) and polymerization results (I) | | | |
|---|---|---|---|---|
| | | Yield of n-hexane-insoluble polymer | | |
| Example or Compar. ex | Ti atom content in solid product (II) (Ti mg/g) | per g of solid product (II) (g/g) | per mg of Ti atom (g × 10$^3$/mg) | Atactic index |
| Example 3 | 29.2 | 2140 | 73.3 | 4.6 |
| Example 4 | 27.1 | 2480 | 91.5 | 4.3 |
| Example 5 | 24.7 | 1540 | 62.3 | 5.1 |
| Example 6 | 22.5 | 3170 | 140.8 | 2.7 |
| Example 7 | 27.8 | 2920 | 105.0 | 3.4 |
| Example 8 | 21.4 | 3220 | 150.5 | 2.9 |
| Example 9 | 31.4 | 2710 | 87.3 | 4.8 |
| Example 10 | 27.3 | 2310 | 84.6 | 5.7 |
| Comp. ex. 3 | 4.1 | 230 | 56.1 | 24.8 |
| Comp. ex. 4 | 29.8 | 1250 | 42.7 | 34.7 |

As apparent from comparison of Example 6 with Comparative example 3 or 4, in Comparative example 3 wherein MgR$^1$R$^2$ of the present invention was replaced by anhydrous MgCl$_2$, the yield of n-hexane-insoluble polymer and the isotactic index are both far inferior to those in Example 6. This also applied to Comparative example 4 wherein the complex of anhydrous AlCl$_3$ with ethyl benzoate of the present invention was replaced by ethyl benzoate.

EXAMPLES 11 AND 12

(i) Preparation of solid product (II):

Example 6 was repeated except that Mg ethoxide was used in an amount of 10.0 g (Example 11) or 20.0 g (Example 12), to obtain corresponding solid products (II).

(ii) Preparation of solid product (III) and propylene slurry polymerization:

They were carried out as in Example 6 (ii) except that the solid product (II) obtained in the above step (i) was used in an amount of 73 mg or 69 mg. The results are shown in Table 3.

EXAMPLE 13 AND 14

(i) Preparation of solid product (II):

In these Examples, solid product (I) was pretreated as follows and then used:

In Example 13, the solid product (I) obtained in Example 11 was used and in Example 14, the solid product (I) obtained in Example 12 was used. The respective solid products (I) (6.0 g) were added into $SiCl_4$ (100 ml), followed by heat treatment at 60° C. for 2 hours, then cooling down to room temperature, filtering off the resulting solid product, 5 times washing it with n-hexane (each time 50 ml) and drying under reduced pressure at room temperature. The thus pretreated solid products (I) (5.0 g)) were reacted with $TiCl_4$ as in Example 6 to obtain corresponding solid products (II). The Ti atom contents in the respective solid products were less than those in the corresponding Examples 11 and 12, that is, 24.3 mg/g (Example 13) and 27.5 mg/g (Example 14).

(ii) Preparation of solid product (III) and propylene slurry polymerization:

They were carried out as in Example 6 (ii) except that the solid products (II) obtained in the above step (i) were used each in an amount of 67 mg. The results are shown in Table 3.

TABLE 3

Preactivated solid products (II) and polymerization results (II)

| Example | Ti atom content in solid product (II) (Ti mg/g) | Yield of n-hexane-insoluble polymer per g of solid product (II) (g/g) | per mg of Ti atom (g × 10³/mg) | Atactic index |
|---------|---|---|---|---|
| Example 11 | 36.3 | 2370 | 65.3 | 8.6 |
| Example 12 | 40.1 | 1250 | 31.1 | 10.7 |
| Example 13 | 24.3 | 3230 | 132.9 | 4.2 |
| Example 14 | 27.5 | 3370 | 122.5 | 5.1 |

As apparent from the above Table, the results of Example 13 were superior to those of Example 11 and also the results of Example 14 were superior to those of Example 12. This shows that in the case where too much Ti mg/g in the solid product (II) reduces the polymerization results, a process wherein at the stage of the solid product (I), this product is treated with $SiCl_4$ is very effective.

EXAMPLE 15

(i) Preparation of solid product (II):

Into a 500 ml three-neck flask were introduced Mg diethoxide (10.0 g) and 1,2-dichloroethane (100 ml), to which the total quantiy of a solution obtained by dissolving a complex (15.0 g) of anhydrous $AlCl_3$ with ethyl benzoate (prepared under the same conditions as in Example 1) in 1,2-dichloroethane (200 ml) was dropwised added with stirring at room temperature over 30 minutes, followed by keeping the mixture at room temperature for 30 minutes, successively raising the temperature up to 80° C. to react them for one hour. The reaction mixture was cooled down room temperature and separated by filtering, followed by 5 times washing the resulting solid product with n-hexane (each time 50 ml) and drying in vacuo (under reduced pressure) at room temperature to obtain a solid product (I) which was then reacted with $TiCl_4$ as in Example 3 to obtain a solid product (II).

(ii) Preparation of solid product (III) and propylene slurry polymerization:

Preparation of the solid product (III) (preactivation of solid product (II)) and propylene slurry polymerization were carried out as in Example 3 except that the solid product (II) obtained in the above step (i) was used. The results are shown in Table 4.

EXAMPLES 16 AND 17

(i) Preparation of solid product (II):

The solid product (I) obtained in Example 15 (i) as an intermediate (5.0 g) was suspended in (a) a mixed liquid of $TiCl_4$ (50 ml) with 1,2-dichloroethane (50 ml) (Example 16) or (b) a mixed liquid of $TiCl_4$ (50 ml) with xylene (50 ml) (Example 17), and the resulting suspensions were respectively treated at 90° C. (Example 16) or 130° C. (Example 17) for one hour. The resulting reaction mixed liquids were respectively subjected to still-standing and removal of the supernatant, followed by again adding the above-mentioned liquid (a) or (b) and treating the resulting suspension at 90° C. or 130° C. for 1.5 hour. The resulting reaction mixed liquids were respectively subjected to still standing and removal of the supernatant and then treated as in Example 3 to obtain solid products (II). Their Ti atom contents were 27.8 and 27.1 Ti mg/g of solid product (II).

(ii) Preparation of solid product (III) and propylene slurry polymerization:

These were carried out as in Example 3 except that the solid products (II) obtained in the above step (i) were used. The results are shown in Table 4.

EXAMPLE 18

(i) Preparation of solid product (II):

Into a 300 ml three-neck flask were introduced an equimolecular complex (7.5 g) of anhydrous $AlCl_3$ with ethyl benzoate (prepared under the same conditions as in Example 1) and 1,2-dichloroethane (100 ml), and Mg diethoxide (5.0 g) was added with stirring at room temperature, followed by reaction at 80° C. for one hour. To this reaction mixture i.e. a suspension containing the solid product (I) was added $TiCl_4$ (100 ml), followed by keeping the mixture at 90° C. for one hour, then still standing and removing the supernatant to remove a mixed liquid of $TiCl_4$ with 1,2-dichloroethane. To the resulting solids were again added $TiCl_4$ (100 ml) and 1,2-dichloroethane (100 ml), followed by keeping the resulting suspension at 90° C. for 1.5 hour, still standing and removing the supernatant to remove the mixed liquid. The resulting solids were three times washed with n-hexane (each time 200 ml) and filtered off and dried in vacuo (under reduced pressure) at room temperature to obtain a solid product (II) having a Ti atom content per g of the product of 23.4 mg.

(ii) Preparation of solid product (III) and propylene slurry polymerization:

These were carried out as in Example 3 except that the solid product (II) obtained in the above step (i) was used. The results are shown in Table 4.

TABLE 4

Preactivated solid product (II) and polymerization results (III)

| Example | Ti atom content in solid product (II) (Ti mg/g) | Yield of n-hexane-insoluble polymer per g of solid product (II) (g/g) | Yield of n-hexane-insoluble polymer per mg of Ti atom (g × 10³/mg) | Atactic index |
|---|---|---|---|---|
| Example 15 | 25.3 | 3030 | 119.8 | 3.4 |
| Example 16 | 27.8 | 2960 | 106.5 | 2.8 |
| Example 17 | 27.1 | 2890 | 105.9 | 3.0 |
| Example 18 | 23.4 | 3150 | 134.6 | 3.3 |

EXAMPLE 19

(i) Preparation of solid product (II):

Example 3 was repeated except that Ti(OBu)$_3$Cl was used as a liquid halogen-containing Ti compound to be reacted with the solid product (I), to obtain a solid product (II).

(ii) Preparation of solid product (III) and propylene slurry polymerization:

These were carried out as in Example 3 except that the solid product (II) (72 mg) obtained in the above step (i) was used. The results are shown in Table 5.

EXAMPLE 20

(ii) Propylene slurry polymerization was carried out as in Example 1 except that the solid product (II) (67 mg) obtained in Example 19 (i) was used. The results are shown in Table 5.

EXAMPLE 21

(i) Preparation of solid product (II):

Example 3 was repeated except that Ti(OBu)Cl$_3$ was used as a liquid halogen-containing Ti compound to be reacted with the solid product (I), to obtain a solid product (II).

(ii) Preparation of solid product (III) and propylene polymerization:

These were carried out as in Example 3 except that the solid product (II) (71 mg) obtained in the above step (i) was used. The results are shown in Table 5.

EXAMPLE 22

(ii) Propylene slurry polymerization was carried out as in Example 1 except that the solid product (II) (72 mg) obtained in the above step (i) was used. The results are shown in Table 5.

EXAMPLE 23

(ii) Preparation of solid product (III) and ethylene polymerization:

Into a 1.5 l capacity autoclave were introduced n-hexane (1,000 ml), triisobutylaluminum (2.0 m mol) and the solid product (II) (21 mg) obtained in Example 3, followed by feeding propylene under a partial pressure of 0.5 kg/cm²G at room temperature and reacting it for 30 minutes for preactivation to prepare a solid product (III). Into the catalyst system was added hydrogen under a partial pressure of 4 kg/cm²G, and ethylene slurry polymerization was carried out under an ethylene partial pressure of 6 kg/cm²G at 80° C. for 2 hours.

EXAMPLE 24

(ii) Preparation of solid product (III) and butene-1 polymerization:

Example 3 (ii) was repeated except that propylene was replaced by butene-1, to prepare a solid product (III), and butene-1 (250 g) was continuously fed at 70° C. over 2 hours to carry out polymerization reaction, followed by releasing unreacted butene-1, cooling, adding methanol (200 ml), filtering off and drying up the solvent to obtain polybutene.

EXAMPLE 25

(i) Preparation of solid product (II):

Into a 500 ml three-neck flask were introduced Mg diethoxide (5.0 g) and toluene (100 ml), to which the total quantity of a solution obtained by dissolving a complex (11.0 g) of DEAC with amyl acetate (a reaction product obtained by reacting the both at 25° C. for 180 minutes) in toluene (100 ml) was dropwise added with stirring at room temperature over 30 minutes, followed by keeping the reaction mixture at room temperature for 30 minutes, then raising the temperature up to 100° C. and reacting them for one hour. The subsequent procedure was carried out as in Example 1 (i) to obtain a solid product (II) having a Ti atom content per g of the product of 38.3 mg.

(ii) Propylene polymerization:

Slurry polymerization was carried out as in Example 1. The results are shown in Table 6.

EXAMPLE 26

Preparation of solid product (II) and propylene polymerization were carried out as in Example 25 except that in the preparation of the solid product (II), the complex of DEAC with amyl acetate was replaced by a complex (12.0 g) of DEAC with methyl toluylate. The results are shown in Table 6.

TABLE 5

Use of liquid halogen-containing compounds other than TiCl$_4$

| Example | Ti atom content in solid product (II) (Ti mg/g) | Yield of n-hexane-insoluble polymer per g of solid product (II) (g/g) | Yield of n-hexane-insoluble polymer per mg of Ti atom (g × 10³/mg) | Atactic index |
|---|---|---|---|---|
| Example 19 | 43.3 | 1150 | 26.6 | 13.8 |
| Example 20 | 43.3 | 1210 | 27.9 | 15.7 |
| Example 21 | 32.5 | 1830 | 56.3 | 7.1 |
| Example 22 | 32.5 | 1760 | 54.2 | 9.7 |

TABLE 6

Polymerization of olefins other than propylene and change in organic ester

| Example | Ti atom content in solid product (II) (Ti mg/g) | Yield of n-hexane-insoluble polymer per g of solid product (II) (g/g) | Yield of n-hexane-insoluble polymer per mg of Ti atom (g × 10³/mg) | Atactic index |
|---|---|---|---|---|
| Example 23 | 29.2 | 6080 | 208.2 | — |
| Example 24 | 29.2 | 1330 | 45.5 | — |
| Example 25 | 38.3 | 1370 | 35.8 | 19.1 |
| Example 26 | 30.4 | 1740 | 53.3 | 17.3 |

What is claimed is:

1. A catalyst component for α-olefin polymerization comprising a solid product (II) obtained by
reacting at least one member selected from the group consisting of magnesium compounds expressed by the general formula MgR$^1$R$^2$ (wherein R$^1$ represents alkyl, aryl, alkoxy or aryloxy group and $R^2$ represents alkyl, aryl, alkoxy, aryloxy group or halogen atom), with a complex compound of at ① least one member selected from the group consisting of aluminum compounds expressed by the general formula $AlR_n{}^3X_{3-n}$ (wherein $R_3$ represents alkyl, aryl, alkoxy or aryloxy group, X represents a halogen atom and n represents a number of $0 \leq n < 2$) with ② esters of carboxylic acid to obtain a solid product (I); and reacting this solid product (I) with a liquid halogen-containing titanium compound.

2. A catalyst component according to claim 1 wherein said esters of carboxylic acid is an ester of an aliphatic or aromatic mono-, di- or tri-carboxylic acid of 1 to 20 carbon atoms with an aliphatic or aromatic mono-, di- or tri-alcohol of 1 to 20 carbon atoms, and does not contain any free carboxyl group or alcohol group.

3. A catalyst component according to claim 1 wherein said complex compound is obtained by reacting an aluminum compound expressed by the general formula $AlR_n{}^3X_{3-n}$ with esters of carboxylic acid, in a mol ratio of the former to the latter of 1:0.1 to 10, at 0° to 100° C. and for 5 minutes to 5 hours.

4. A catalyst component according to claim 1 wherein said solid product (I) is obtained by reacting said at least one magnesium compound having the general formula $MgR^1R^2$ with said complex compound in a ratio by weight of the former to the latter of 1:0.05 to 5, at $-10°$ C. to $+150°$ C. and for 0.5 to 6 hours.

5. A catalyst component according to claim 1 wherein said solid product (II) is obtained by reacting said solid product (1) with said liquid halogen-containing titanium compound in an amount of 1 to 100 ml per g of said product (I), at 50° C. to 200° C. for 0.5 to 6 hours.

6. A catalyst component according to claim 1 wherein said solid product (I) is mixed with silicon tetrachloride in an amount of 1 to 1,000 ml per g of the product (I), and the mixture is treated at 20° C. to 150° C. for 10 minutes to 12 hours and then reacted with said liquid halogen-containing titanium compound.

7. A catalyst component for α-olefin polymerization comprising a solid product (III) obtained by reacting at least one member selected from the group consisting of magnesium compounds expressed by the general formula $MgR^1R^2$ (wherein $R^1$ represents alkyl, aryl, alkoxy or aryloxy group and $R^2$ represents alkyl, aryl, alkoxy, aryloxy group or halogen atom), with a complex of ① at least one member selected from the group consisting of aluminum compounds expressed by the general formula $AlR_n{}^3X_{3-n}$ (wherein $R_3$ represents alkyl, aryl, alkoxy or aryloxy group, X represents a halogen atom and n represents a number of $0 \leq n < 2$) with ② esters of carboxylic acid, to obtain a solid product (I);

reacting this solid product (I) with a liquid halogen-containing titanium compound, to obtain a solid product (II); and preactivating this solid product (II) in combination with an organoaluminum compound and an α-olefin.

8. A catalyst component according to claim 7 wherein said esters of carboxylic acid is an ester of an aliphatic or aromatic mono-, di- or tri-carboxylic acid of 1 to 20 carbon atoms with an aliphatic or aromatic mono-, di- or tri-alcohol of 1 to 20 carbon atoms, and does not contain any free carboxyl group or alcohol group.

9. A catalyst component according to claim 7 wherein said complex compound is obtained by reacting an aluminum compound expressed by the general formula $AlR_n{}^3X_{3-n}$ with esters of carboxylic acid, in a mol ratio of the former to the latter of 1:0.1 to 10, at 0° to 100° C. and for 5 minutes to 5 hours.

10. A catalyst component according to claim 7 wherein said solid product (I) is obtained by reacting said at least one magnesium compound having the general formula $MgR^1R^2$ with said complex compound in a ratio by weight of the former to the latter of 1:0.05 to 5, at $-10°$ C. to $+150°$ C. and for 0.5 to 6 hours.

11. A catalyst component according to claim 7 wherein said solid product (II) is obtained by reacting said solid product (1) with said liquid halogen-containing titanium compound in an amount of 1 to 100 ml per g of said product (I), at 50° C. to 200° C. for 0.5 to 6 hours.

12. A catalyst component according to claim 7 wherein said solid product (II) is preactivated with 0.1 to 500 g of an organoaluminum compound, 0.05 to 20 g of an electron donor, 0.05 to 1,000 g of an α-olefin, 0 to 1,000 ml of hydrogen and 0 to 80 l of a solvent, each per g of the solid product (II), at 0° C. to 100° C. for one minute to 20 hours.

13. A catalyst component according to claim 7 wherein said solid product (I) is mixed with silicon tetrachloride in an amount of 1 to 1,000 ml per g of the product (I), and the mixture is treated at 20° C. to 150° C. for 10 minutes to 12 hours and then reacted with said liquid halogen-containing titanium compound.

\* \* \* \* \*